(12) United States Patent
Nagano et al.

(10) Patent No.: US 7,224,325 B2
(45) Date of Patent: May 29, 2007

(54) VEHICLE DISPLAY DEVICE

(75) Inventors: Keiichi Nagano, Nagaoka (JP);
Takashi Yamazoe, Nagaoka (JP);
Fukuya Iguchi, Nagaoka (JP);
Tadahiro Uchiyama, Nagaoka (JP);
Masashi Seki, Nagaoka (JP)

(73) Assignee: Nippon Seiki Co., Ltd., Niigata (JP)

( * ) Notice: Subject to any disclaimer, the term of this patent is extended or adjusted under 35 U.S.C. 154(b) by 630 days.

(21) Appl. No.: 10/485,399

(22) PCT Filed: Aug. 31, 2002

(86) PCT No.: PCT/JP01/07578

§ 371 (c)(1),
(2), (4) Date: Jan. 30, 2004

(87) PCT Pub. No.: WO03/011628

PCT Pub. Date: Feb. 13, 2003

(65) Prior Publication Data

US 2004/0183750 A1     Sep. 23, 2004

(30) Foreign Application Priority Data

Jul. 30, 2001  (JP)  ............... 2001-230063
Jul. 30, 2001  (JP)  ............... 2001-230064

(51) Int. Cl.
*G09G 5/00* (2006.01)
(52) U.S. Cl. ............... 345/7; 345/8; 359/630
(58) Field of Classification Search ......... 345/7–9, 345/82–83, 87–88, 204, 207; 359/630–633, 359/639, 618; 349/11
See application file for complete search history.

(56) References Cited

U.S. PATENT DOCUMENTS

| | | | | |
|---|---|---|---|---|
| 5,734,357 A | * | 3/1998 | Matsumoto | 345/7 |
| 5,760,931 A | * | 6/1998 | Saburi et al. | 359/13 |
| 5,784,036 A | * | 7/1998 | Higuchi et al. | 345/7 |
| 6,891,563 B2 | * | 5/2005 | Schofield et al. | 348/148 |
| 7,167,779 B2 | * | 1/2007 | Kashiwada et al. | 701/1 |
| 2003/0016451 A1 | * | 1/2003 | Aoki et al. | 359/633 |
| 2004/0178894 A1 | * | 9/2004 | Janssen | 340/435 |

FOREIGN PATENT DOCUMENTS

JP   178093/1983   6/1985
JP   11803/1984    2/1986

(Continued)

*Primary Examiner*—Richard Hjerpe
*Assistant Examiner*—Mansour M. Said
(74) *Attorney, Agent, or Firm*—McDermott Will & Emery LLP

(57) ABSTRACT

A vehicular display device, in which positional adjustment of a display image is easy, is provided, and the vehicular display device (head-up display) 1 comprises a display 3 to emit a display light forming a predetermined display image, a reflecting member to reflect the display light to a driver to have the driver recognizing the display image, moving means (motor) 7 for varying a direction of irradiation of the display light irradiated on the reflecting member to move a display position of the display image, operation means (control unit) 14 to allow driving of the moving means 7, and control means 11 for displaying a mark indicative of a display range of the display image when the operation means 14 is operated.

17 Claims, 8 Drawing Sheets

FOREIGN PATENT DOCUMENTS

| | | |
|---|---|---|
| JP | 36231/1986 | 9/1987 |
| JP | 98463/1987 | 1/1989 |
| JP | 150232/1987 | 4/1989 |
| JP | 4-283134 A | 10/1992 |
| JP | 7-266925 A | 10/1995 |
| JP | 8-25999 A | 1/1996 |
| JP | 2003-203309 A | 7/2000 |

* cited by examiner

FIG. 4
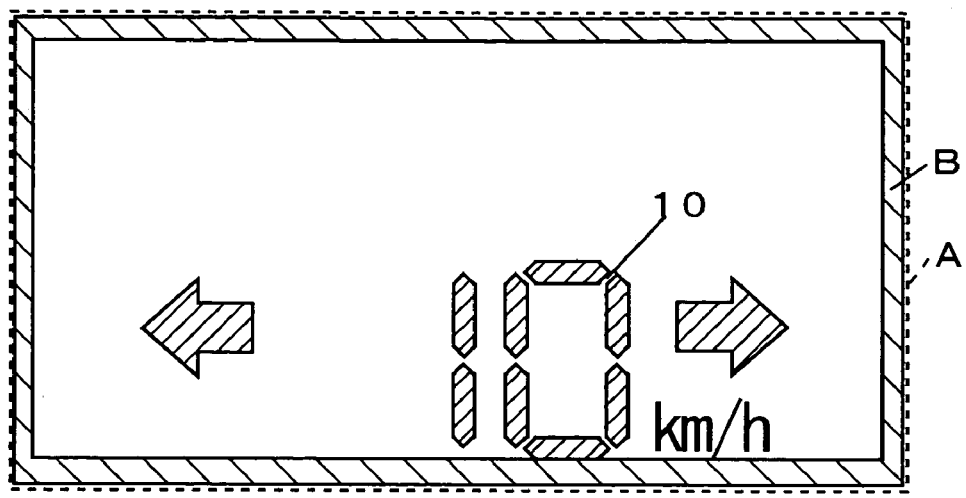
(a)
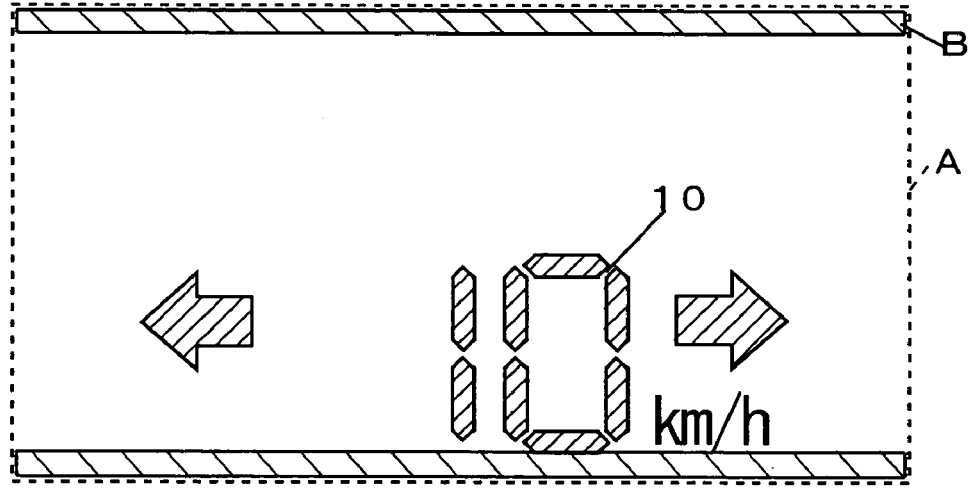
(b)
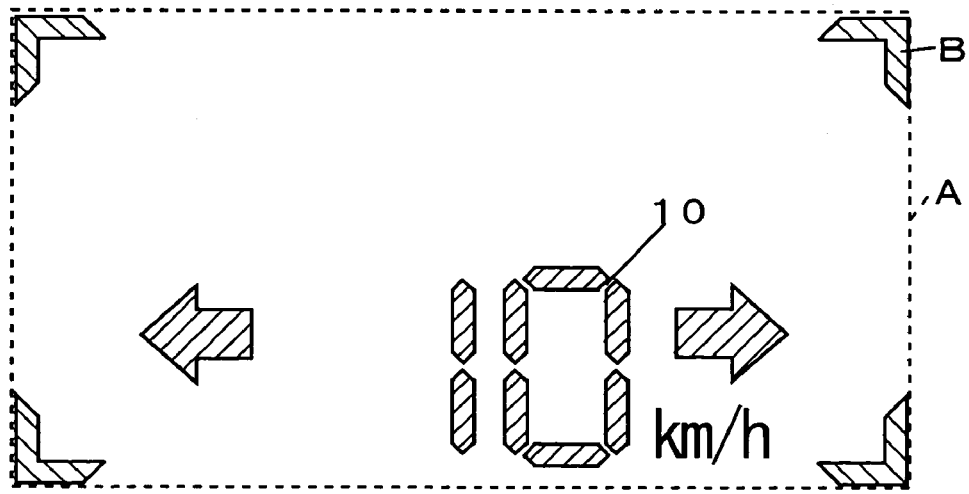
(c)

VEHICLE DISPLAY DEVICE

TECHNICAL FIELD

The invention relates to a vehicular display device, and more particular, to a vehicular display device, in which predetermined information is displayed in a display region on a windshield.

BACKGROUND ART

Conventionally, a so-called head-up display in, for example, vehicular display devices for automobiles and so on has been known to be directed to improving visibility when a driver sees a display in running. Such head-up display is configured such that a display light emitted from a luminous display installed in a lower portion of a windshield is reflected toward a driver by a thin-layer combiner (reflecting member) formed on a surface of the windshield, or a windshield (reflecting member) having been subjected to combiner processing, whereby the driver overlaps a display image being a virtual image, on front scenery through the windshield to recognize them.

When such arrangement is adopted, the driver can be improved in visibility since movements of line of sight due to alternation of seeing the front through the windshield and visual confirmation of display information are much reduced as compared with the case of seeing a conventional display device (meter device) mounted in a predetermined location on an instrument panel. Also, since the driver can confirm the display image projected onto the windshield without greatly changing an eye's focus from that in the case of seeing the front through the windshield, a period of time required for recognition of display information is shortened and the driver can confirm the display information while seeing a field of front vision, thus enabling enhancing safety in running.

Here, with such head-up display, the driver overlaps the display image being a virtual image, on front scenery through the windshield to recognize them, so that there is a need of modifying a position of the display image to put the same in agreement with the driver's viewpoint.

Generally, a driver selects a position of the display image in agreement with the driver's viewpoint by moving the display image vertically by means of operation of a control switch for rotating movement of a reflector in the display.

Since a display lighted when a driver performs positional adjustment of the display image constitutes a part of a display fully lighted, however, there is involved a problem that when performing positional adjustment of the display image, the driver must adjust a position of the display image while remaining unable to recognize a whole range of the display image and so positional adjustment of the display image is difficult to perform correctly.

JP-A-7-266925 is known to aim at solving such problem and to put a head-up display in a full lighting mode and set its display luminance to a maximum value at the time of vehicle stopping immediately after ignition is made ON.

However, such head-up display is configured such that a display is put in a full lighting mode only immediately after ignition is made ON and when a gear is in a parking state, so that a chance is limitative, in which positional adjustment of a display image can be readily performed. Also, there is involved a problem that visibility cannot be improved in the daytime even when a display has a maximum luminance, and a demand is made for a head-up display capable of readily performing positional adjustment of the display image irrespective of night and day.

In view of such problems, the invention has its object to provide a vehicular display device, in which a chance, in which positional adjustment of a display image is performed, is not limited, and a display image can be readily adjusted to a position in agreement with a driver's viewpoint.

DISCLOSURE OF THE INVENTION

The invention is featured to comprise a display to emit a display light forming a predetermined display image, a reflecting member to reflect the display light to a driver to have the driver recognizing the display image, moving means for varying a direction of irradiation of the display light irradiated on the reflecting member to move a display position of the display image, operation means to allow driving of the moving means, and control means for displaying a mark indicative of a display range of the display image when the operation means is operated.

With such constitution, the control means displays the mark indicative of the display range of the display image simultaneously when a driver operates the operation means, whereby adjustment to a position in agreement with a driver's viewpoint can be readily made without restricting a chance of positional adjustment of the display image.

Also, the invention is featured to comprise a display to emit a display light forming a predetermined display image, a reflecting member to reflect the display light to a driver to have the driver recognizing the display image, moving means for varying a direction of irradiation of the display light irradiated on the reflecting member to move a display position of the display image, operation means to allow driving of the moving means, and control means for reversedly displaying luminous locations, which constitute the display image, and non-luminous locations except the luminous locations in a display range of the display image when the operation means is operated.

With such constitution, the control means reversedly displays the luminous locations and the non-luminous locations in the display range when the operation means is operated, whereby it becomes possible to have a driver recognizing the display range without any special display indicative of the display range and to use a simple constitution to easily adjust a position of the display image to a position in agreement with a driver's viewpoint.

Also, the invention is featured to comprise a display to emit a display light forming a predetermined display image, a reflecting member to reflect the display light to a driver to have the driver recognizing the display image, moving means for varying a direction of irradiation of the display light irradiated on the reflecting member to move a display position of the display image, operation means to allow driving of the moving means, and control means for causing luminous displaying of a whole display range of the display image when the operation means is operated.

With such constitution, the control means luminous-displays the whole display range when the operation means is operated, whereby it becomes possible to have a driver recognizing the display range without any special display indicative of the display range and to use a simple constitution to easily adjust a position of the display image to a position in agreement with a driver's viewpoint.

Also, the invention is featured to comprise a display to emit a display light forming a predetermined display image, a reflecting member to reflect the display light to a driver to have the driver recognizing the display image, moving means for varying a direction of irradiation of the display light irradiated on the reflecting member to move a display position of the display image, operation means to allow driving of the moving means, and control means for displaying a mark indicative of a display range of the display image when the operation means is operated, and displaying a first display portion of the mark corresponding to a direction, in which the display image is moved by the operation means, in a different manner from a second display portion being another display portion of the mark.

With such constitution, the control means displays the first display portion of the mark corresponding to a direction, in which the display image is moved by the operation means, in a different manner from the second display portion, whereby it becomes possible to have a driver clearly recognizing the move direction of the display image and to easily adjust a position of the display image to a position in agreement with a driver's viewpoint.

Also, the invention is featured to comprise a display to emit a display light forming a predetermined display image, a reflecting member to reflect the display light to a driver to have the driver recognizing the display image, moving means for varying a direction of irradiation of the display light irradiated on the reflecting member to move a display position of the display image, operation means to allow driving of the moving means, and control means for displaying a mark indicative of a display range of the display image when the operation means is operated, and holding displaying of the mark for a predetermined period of time after operation of the operation means is not performed.

With such constitution, displaying of the mark is held for a predetermined holding time after a driver terminates operation of the control unit, whereby the driver can recognize the display range of the display image when performing positional adjustment of the display image and can confirm whether a position of the display image is in agreement with the driver's viewpoint, after the positional adjustment and make an adjustment very easily so that a display position of the display image is made in agreement with the driver's viewpoint.

BRIEF DESCRIPTION OF THE DRAWINGS

FIGS. 1 to 4 are views showing a first embodiment, FIG. 1 being a view showing a whole configuration of a head-up display, FIG. 2 being a block diagram illustrating an electrical constitution of the head-up display, FIG. 3 being a view showing an example of a display image in the head-up display, and FIG. 4 being a view showing a display example in the head-up display.

BEST MODE FOR CARRYING OUT THE INVENTION

A first embodiment of the invention will be described below with reference to the drawings.

Figure 1:
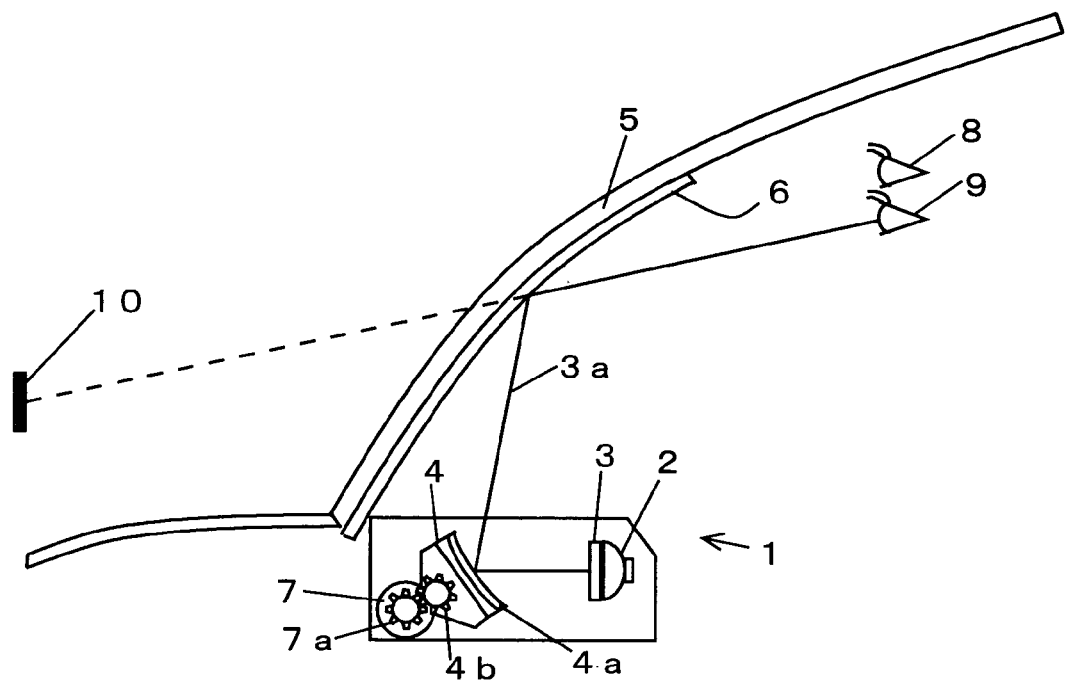

In FIG. 1, a head-up display 1 comprises a light source 2, a display 3, a reflecting mirror 4, a windshield 5, a combiner (reflecting member) 6, and a motor (moving means) 7.

The light source 2 emits light toward the display 3 described later.

The display 3 comprises a light receiving display device such as liquid crystal device (LCD), or the like, and is provided with a predetermined display pattern indicative of operation information such as vehicle speed, rotational speed of an engine, or the like, the display being arranged in front of the light source 2. Also, the display 3 transmits therethrough light emitted from the light source 2 to emit the display pattern being a predetermined display light 3a.

The reflecting mirror 4 reflects the display light 3a, which is emitted from the display 3, to the combiner 6 described later, and comprises a reflecting surface 4a for reflection of display light, and a gear portion 4b meshing with a gear 7a mounted on a shaft of the motor 7 described later.

The combiner 6 comprises a thin-film reflecting member formed on a room side of the windshield 5 to reflect the display light 3a toward a driver.

The motor 7 comprises moving means for rotatingly moving the reflecting mirror 4 to vary an angle of the reflecting surface 4a to move a direction of reflection of the display light 3a vertically. For example, when a driver's viewpoint is positioned at a viewpoint 8, the motor 7 is used to adjust an angle of the reflecting mirror 4 whereby a direction of reflection of the display light 3a having been set in a direction in agreement with a viewpoint 9 is adjusted to a direction of reflection in agreement with the driver's viewpoint 8 to direct the display light 3a to the driver. The driver, to which the display light 3a is directed, overlaps a display image 10 being a virtual image, on front scenery through the windshield 5 to recognize them. Thereby, the driver can recognize the display image 10 in a position easy to see.

Figure 2:
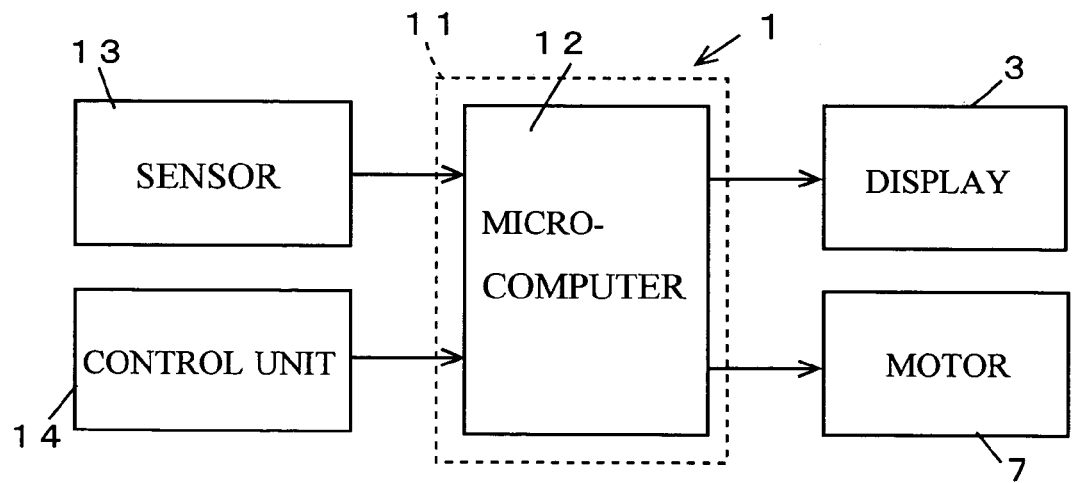

Subsequently, an electrical constitution of the head-up display 1 is described with reference to FIG. 2.

The head-up display 1 is mainly composed of a microcomputer 12 being control means 11, a sensor 13 such as speed sensor or the like, a control unit 14 being control means, and the motor 7 provided on the reflecting mirror 4.

The control means 11 comprises the microcomputer 12 which is calculation means for executing a predetermined program, and when a running signal corresponding to a running state, such as vehicle speed or the like, of a vehicle is input via a sensor 13, predetermined calculation is performed corresponding to such running signal and a control signal corresponding to results of the calculation is output to the display 3 via a drive circuit (not shown) to provide a display pattern indicative of speed corresponding to the running state of the vehicle.

Also, the control means 11 executes a processing relating to positional adjustment, described later, of a display image 10 on the display 3 and mark displaying described later on the basis of an operation signal input from the control unit 14.

The control unit 14 comprises plural groups of switches composed of push button switches or the like to adjust a display position of a display image 10 and adjust ON/OFF and display luminance of the head-up display 1 itself, or the like according to a driver's taste.

Figure 3:
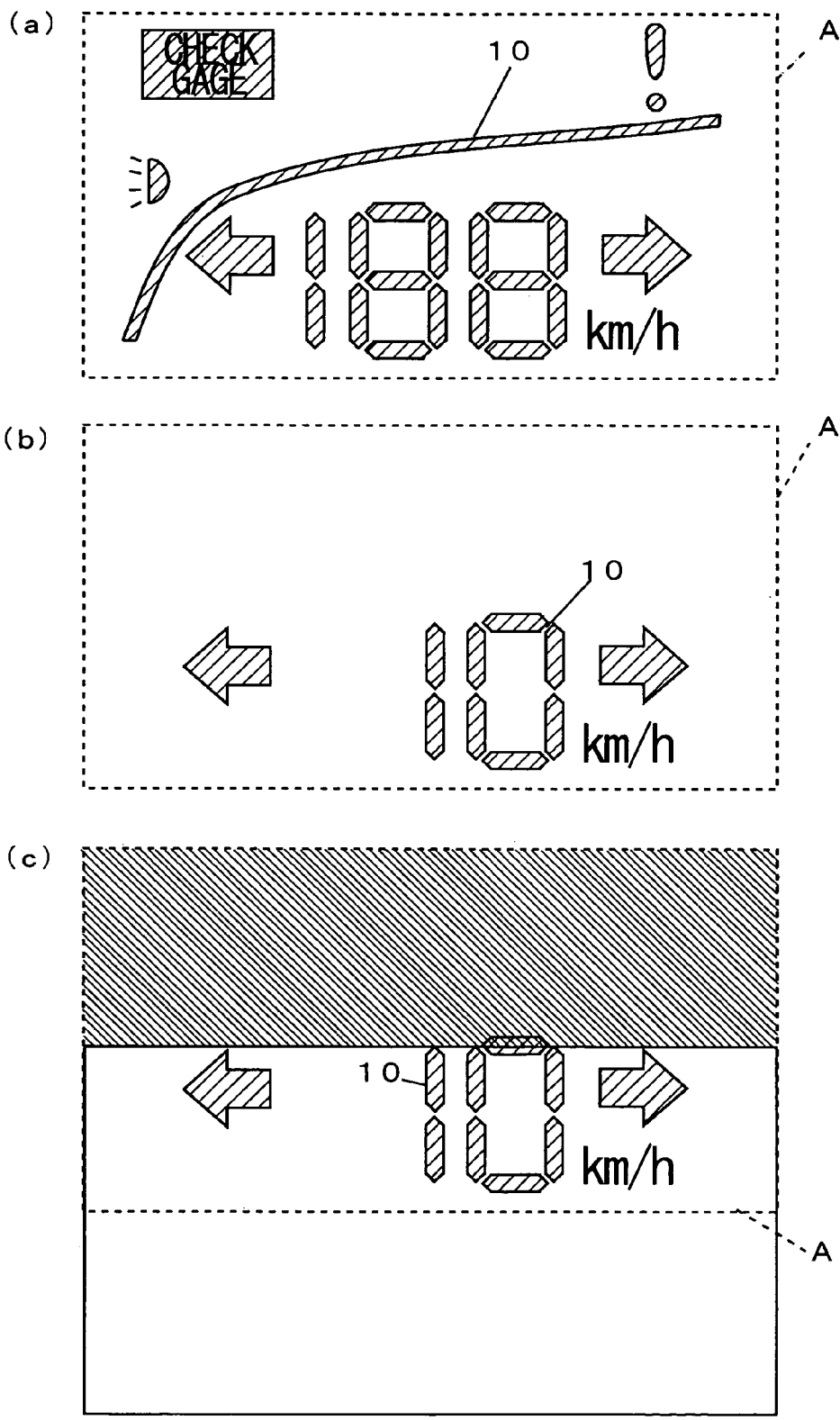

Subsequently, positional adjustment of a display image 10 and a method of displaying a mark indicative of a display range of the display image 10 are described with reference to FIGS. 3 and 4.

First, positional adjustment of a display image 10 is described. In the case where adjustment is made to conform to a viewpoint 9 as shown in FIG. 1, a display image 10 is recognized as shown in FIG. 3(*c*) from a viewpoint 8 and so a whole display range A of the display image 10 cannot be recognized (a hatched area indicates an area outside a recognition range of a driver). The display range A referred hereto indicates a region covering a whole range, in which the light receiving display device is formed in the display 3, and a range, in which displaying is done in a full lighted state. In order to achieve a state shown in FIG. 3(*b*) in the case where a driver's viewpoint is in a position of the viewpoint 8, a driver adjusts a position of a display image 10 by operating the control unit 14 to drive the motor 7 to vary an angle of the reflecting surface 4a of the reflecting mirror 4. However, the driver finds difficulty in grasping the display range A of the display image 10 at the time of ordinary lighting, as compared with a state shown in FIG. 3(*a*) at the time of full lighting.

Therefore, with the head-up display 1, when a driver operates the control unit 14 to have an input signal of the control unit 14 input into the control means 11, a control signal is output to the display 3 to display a mark B simultaneously with actuation of the motor 7 so that the display range A of the display image 10 on the display 3 can be recognized. The mark B is a frame mark indicative of the display range A as shown in FIG. 4 (FIG. 4(*a*)). Also, the frame mark may be shaped to comprise a disconnected frame (FIG. 4 (*b*)) positioned on top and bottom of the display range A but not existent left and right of the display range, or parentheses positioned in corners of the display range A (FIG. 4(*c*)).

With such head-up display 1, the control means 11 displays a mark B indicative of the display range A of the display image 10 simultaneously when a driver operates the control unit 14, whereby easy adjustment to a position corresponding to a driver's viewpoint can be made without restricting a chance of positional adjustment of the display image 10.

In particular, in the case where a mark B being a frame mark provided in a manner to surround a periphery of the display range A is used as a mark indicative of the display range A of the display image 10, it is possible to have the display range A recognized by a driver by means of a simple design relative to the display image 10 without obstructing displaying of the display image 10.

Subsequently, a second embodiment of the invention is described with reference to FIG. 5, and the same elements as or corresponding to those in the above embodiment are denoted by the same reference numerals, an explanation thereof being omitted.

A head-up display 1 according to the second embodiment of the invention is different from the first embodiment of the invention in that a mark C is used as a mark indicative of a display range A.

Figure 5:
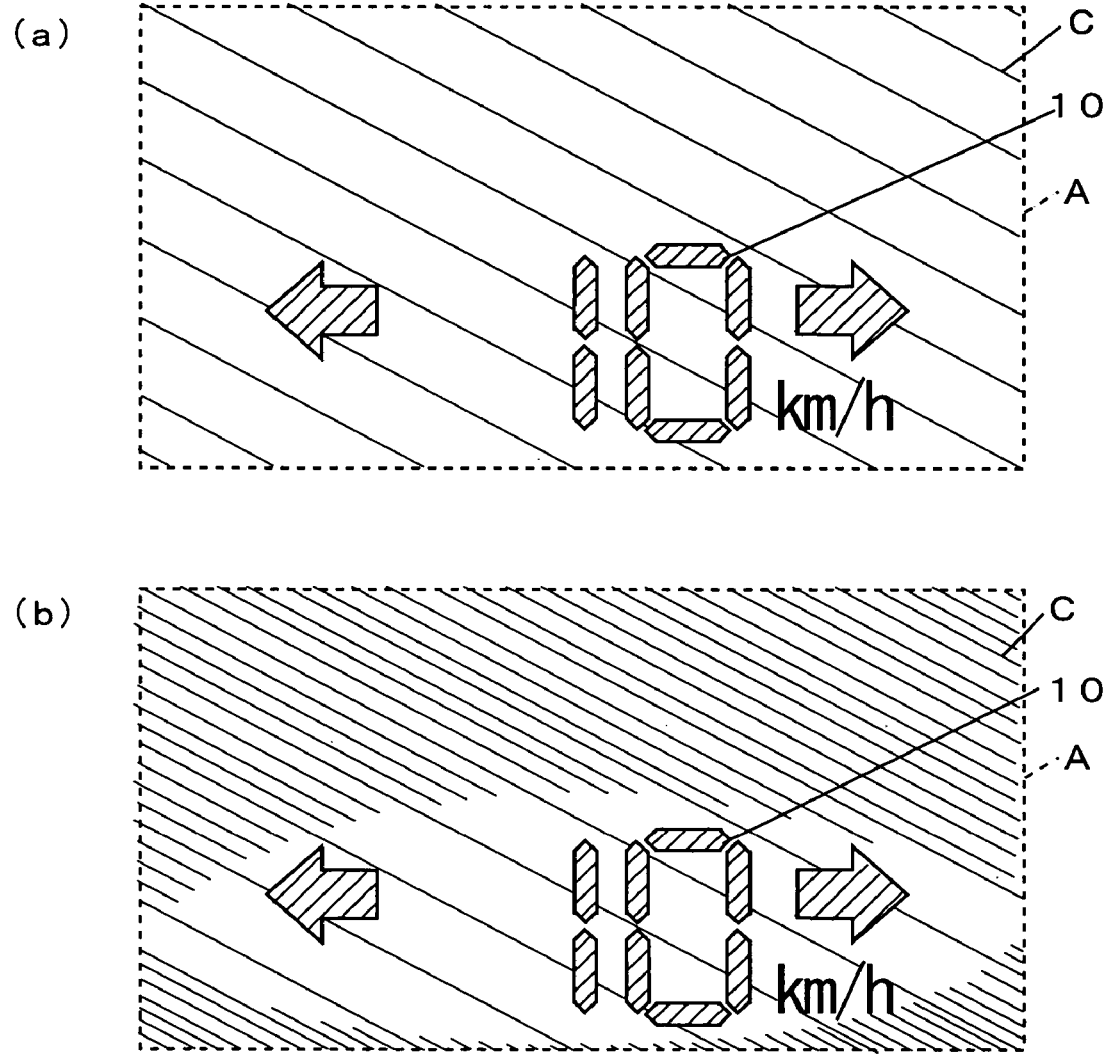
FIG. 5 is a view showing a second embodiment and a display example in a head-up display.

In FIG. 5, the mark C is a background mark using a different color from a display color of a display image 10 to represent a background part except the display image 10 in the display range A (FIG. 5(*a*)). The different color means one different in hue and brightness, or hue or brightness from that of the display image 10.

Also, the background mark C may be one having gradation, in which density is varied from a center of the display range A to a periphery thereof (FIG. 5(*b*)).

In such head-up display 1, in the case of using, as a mark indicative of the display range A of the display image 10, the mark C being a background mark using a different color from a display color of the display image 10 to display a background part except the display image 10 in the display range A, a distinctive design is used to enable a driver to recognize the display range A of the display image 10. Also, by displaying the mark C of such distinctive design on the basis of operation of the switch unit 14, adjustment to a position in agreement with a driver's viewpoint can be easily made without restricting a chance of positional adjustment of the display image 10.

Subsequently, a method of displaying a display range A of a display image 10, according to a third embodiment of the invention, is described with reference to FIG. 6, and the same elements as or corresponding to those in the first and second embodiments are denoted by the same reference numerals, an explanation thereof being omitted.

A head-up display 1 according to the third embodiment of the invention is different from the first embodiment of the invention in that when a driver operates the control unit 14 to have an input signal of the control unit 14 input into the control means 11, in order to make the display range A of the display image 10 on the display 3 recognizable simultaneously with actuation of the motor 7, a control signal is output to the display 3 to reversely display luminous locations, which constitute the display image 10, and non-luminous locations except the display image 10 in the display range A of the display image 10.

Figure 6:
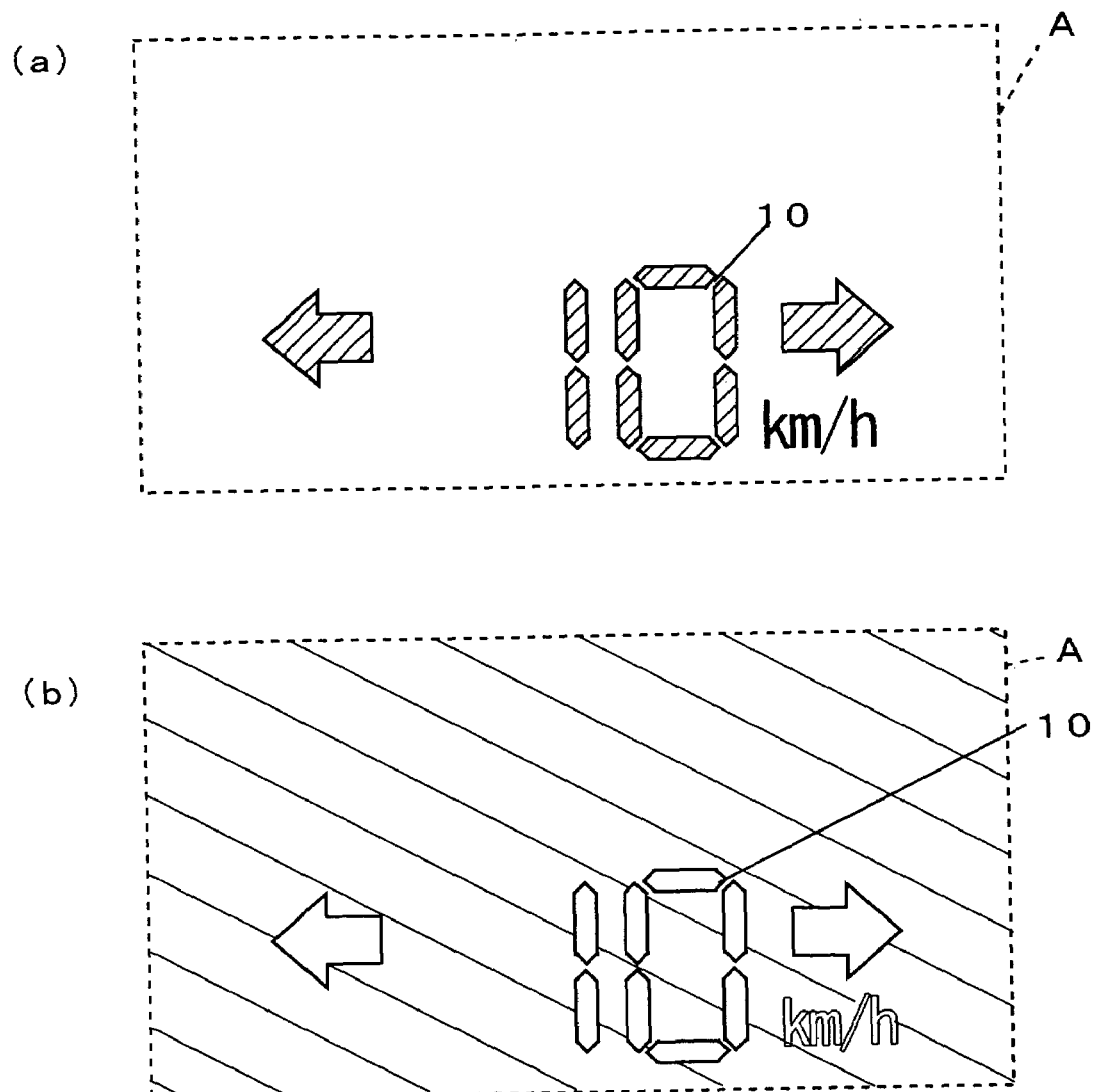
FIG. 6 is a view showing a third embodiment and a display example in a head-up display.

In FIG. 6, the display range A represents the display image 10 in positive representation at the time of ordinary lighting such that inside portions of the display image 10 become luminous and a background part constituted by portions outside the display image 10 become non-luminous (FIG. 6(*a*)). When a driver operates the control unit 14 to have an input signal of the control unit 14 input into the control means 11, the control means 11 reversedly displays the display image 10 in negative representation simultaneously with actuation of the motor 7 such that the inside portions of the display image 10 in the display range A are made non-luminous and the background part constituted by portions outside the display image 10 is made luminous (FIG. 6(*b*)). At this time, the background part made luminous constitutes a mark to make the display range A of the display image 10 on the display 3 recognizable. In view of visibility on a driver's part in negative representation of the display image 10, it is desired that luminance of the background part in the display range A be less than that of the display image 10 at the time of ordinary lighting.

By reversedly displaying luminous locations and non-luminous locations in the display range A at the time of operation of the control unit 14, it becomes possible in such head-up display 1 to have a driver recognizing the display range A without any special display indicative of the display range A and to use a simple constitution to easily adjust a position of the display image 10 to a position in agreement with the driver's viewpoint.

Also, luminance when luminous locations and non-luminous locations in the display range A are reversedly displayed is made less than luminance in displaying prior to reversal, and even when reverse displaying makes luminous locations larger in area than that prior to reversal, it is possible to inhibit that brightness in displaying, which is recognized by a driver, from becoming excessive, thus enabling improving visibility on a driver's part.

Subsequently, a method of displaying a display range A of a display image 10, according to a fourth embodiment of the invention, is described with reference to FIG. 7, and the same elements as or corresponding to those in the first to third embodiments are denoted by the same reference numerals, an explanation thereof being omitted.

Figure 7:
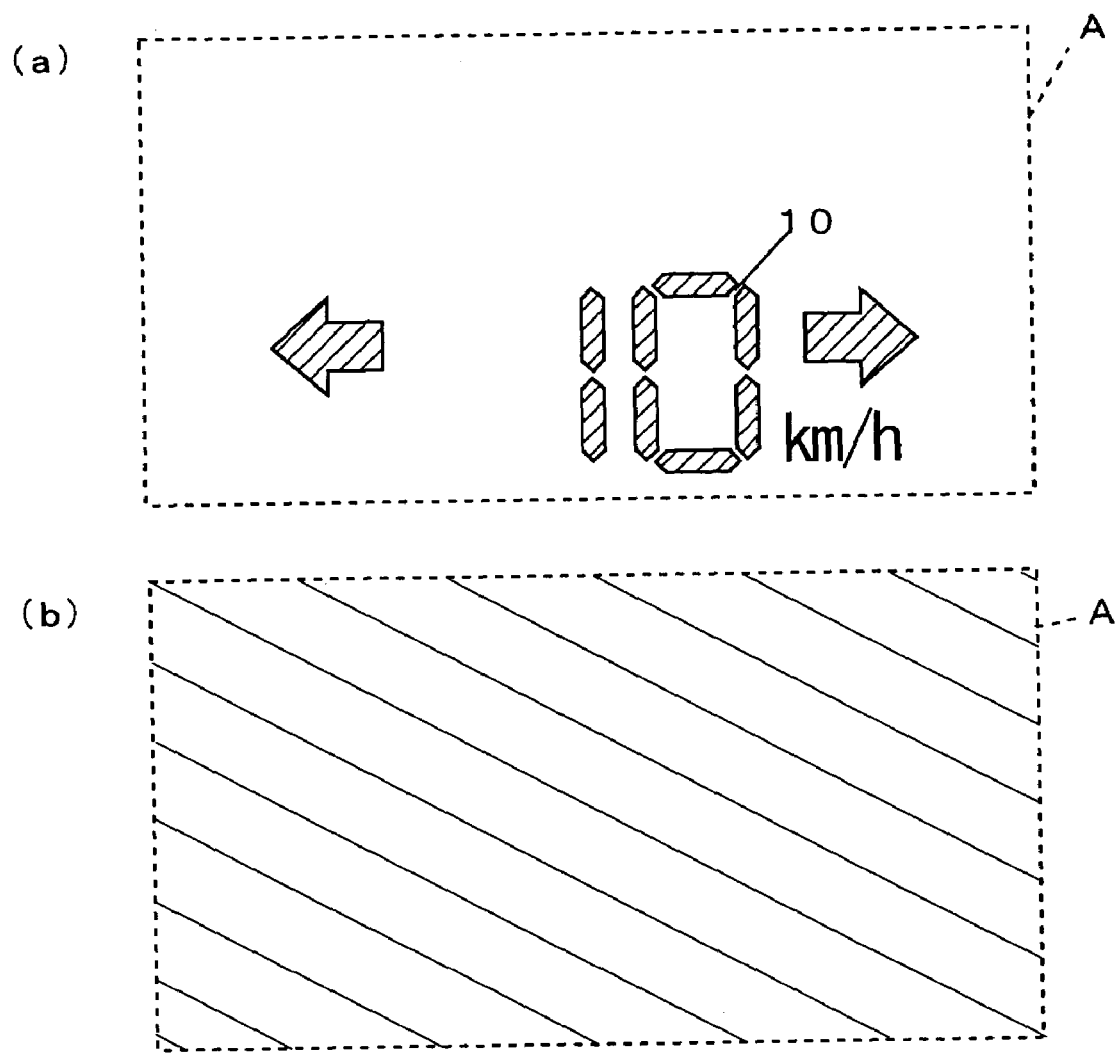
FIG. 7 is a view showing a fourth embodiment and a display example in a head-up display.

In FIG. 7, the display range A displays the display image 10 in positive representation at the time of ordinary lighting such that inside portions of the display image 10 become luminous and a background part constituted by portions outside the display image 10 become non-luminous (FIG. 7(a)). When a driver operates the control unit 14 to have an input signal of the control unit 14 input into the control means 11, the control means 11 causes luminous displaying all regions in the display range A simultaneously with actuation of the motor 7 (FIG. 7(b)). At this time, all those regions in the display range A, which are subjected to luminous displaying, constitute a mark to make the display range A of the display image 10 on the display 3 recognizable. In view of visibility on a driver's part in luminous displaying of all regions in the display range A, it is desired that luminance of luminous displaying in the display range A be made less than that of the display image 10 at the time of ordinary lighting.

By luminous displaying of the whole display range A at the time of operation of the control unit 14, it becomes possible in such head-up display 1 to have a driver recognizing the display range A without any special display indicative of the display range A and to use a simple constitution to easily adjust a position of the display image 10 to a position in agreement with the driver's viewpoint.

Also, luminance at the time of luminous displaying of the whole display range A is made less than luminance in displaying at the time of ordinary lighting, and even when general luminous displaying makes luminous locations in area larger than that at the time of ordinary lighting, it is possible to inhibit that brightness in displaying, which is recognized by a driver, from becoming excessive, thus enabling improving visibility on a driver's part.

Subsequently, a method of displaying a display range A of a display image 10, according to a fifth embodiment of the invention, is described with reference to FIG. 8, and the same elements as or corresponding to those in the first to fourth embodiments are denoted by the same reference numerals, an explanation thereof being omitted.

Figure 8:
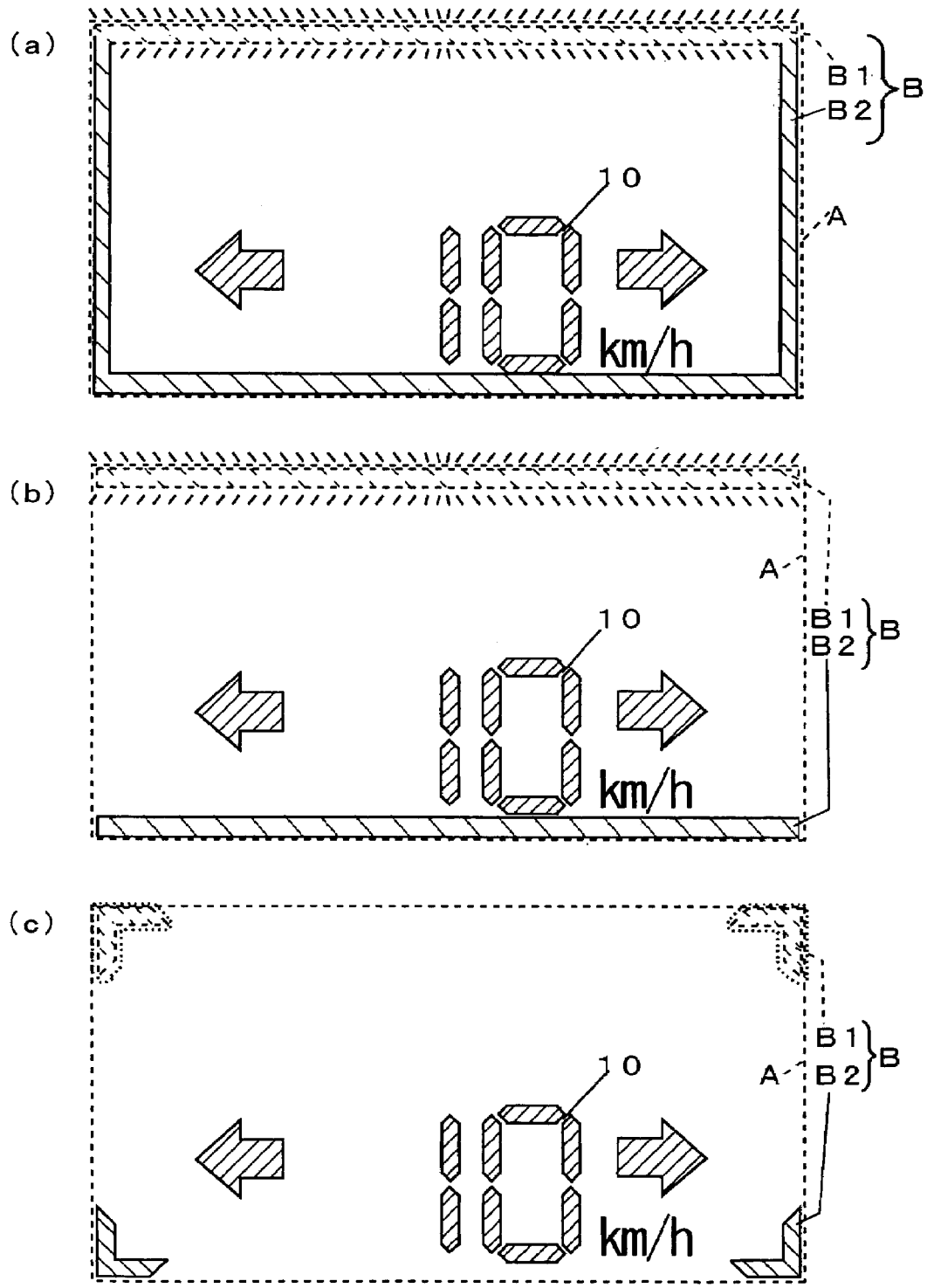
FIG. 8 is a view showing a fifth embodiment and a display example in a head-up display.

In FIG. 8, when a driver operates the control unit 14 to have an input signal of the control unit 14 input into the control means 11, a head-up display 1 outputs a control signal to the display 3 to display a mark B in order to make the display range A of the display image 10 on the display 3 recognizable simultaneously with actuation of the motor 7. The mark B is a frame mark indicative of the display range A as shown in FIG. 4 (FIG. 8(a)). Also, the frame mark may be shaped to comprise a disconnected frame (FIG. 8 (b)) positioned on top and bottom of the display range A but not existent left and right of the display range A, or parentheses positioned in corners of the display range A (FIG. 8(c)).

Also, in the case where an input signal of the control unit 14 input into the control means 11 moves the display image 10 upward, the control means 11 has the mark B displayed and makes flashing displaying so that a first display portion B1 corresponding to a move direction of the display image 10 be displayed in a different manner from a second display portion B2 being another display portion as shown in FIG. 4. In the case where an input signal of the control unit 14 input into the control means 11 moves the display image 10 downward, a display portion positioned below the mark B makes a first display portion corresponding to the move direction of the display image 10 to be subjected to flashing displaying.

Also, a method of displaying the first display portion B1 in a different manner from the second display portion B2 being another display portion may comprise displaying the first display portion B1 in a different color from that of the second display portion B2, or a combination of flashing displaying and displaying in different colors, or the like.

With such head-up display 1, the first display portion B1 of the mark B corresponding to a move direction of the display image 10 by operation of the control unit 14 is displayed in a different manner from the second display portion B2 by the control means 11 whereby it becomes possible to have a driver clearly recognizing the move direction of the display image 10 to easily adjust a position of the display image 10 to a position in agreement with the driver's viewpoint.

Figure 9:
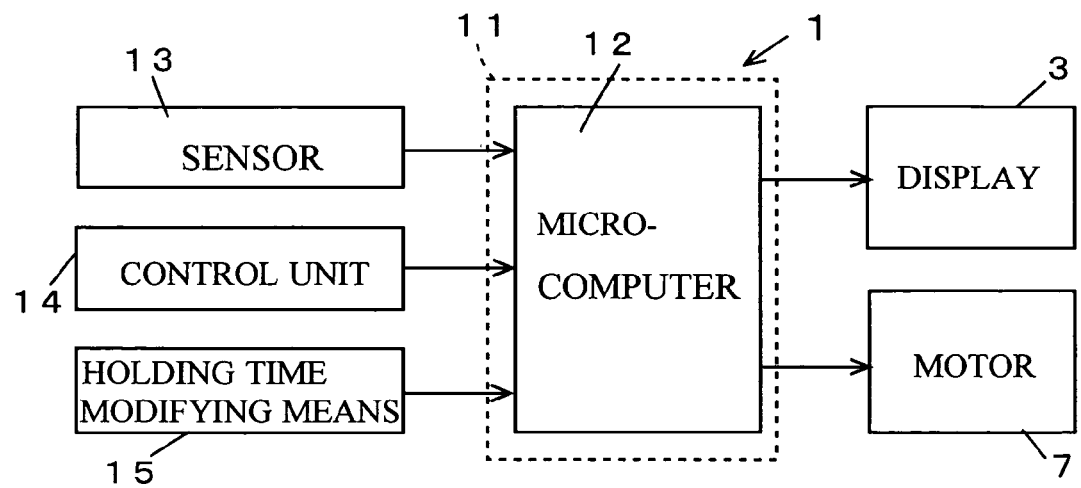
FIGS. 9 and 10 are views showing a sixth embodiment, FIG. 9 being a block diagram illustrating an electrical constitution of a head-up display, and FIG. 10 being a view showing the relationship between switch inputting in a control unit and a period of time, in which a mark is displayed.

Subsequently, a method of displaying a display range A of a display image 10, according to a sixth embodiment of the invention, is described with reference to FIGS. 9 and 10, and the same elements as or corresponding to those in the first to fifth embodiments are denoted by the same reference numerals, an explanation thereof being omitted.

Subsequently, an electrical constitution of a head-up display 1 is described with reference to FIG. 9.

The head-up display 1 is mainly composed of a microcomputer 12 being control means 11, a sensor 13 such as speed sensor or the like, a control unit 14 being control means, holding time modifying means 15 for adjusting a period of time, described later, in which a mark is displayed, and a motor 7 provided on a reflecting mirror 4.

The holding time modifying means 15 is composed of, for example, variable resistor, dip switch, rotary switch, or the like to modify a period of time, described later, in which displaying of a mark is held, according to a driver's taste.

Subsequently, positional adjustment of a display image 10 and a method of displaying a mark indicative of a display range of the display image 10 are described with reference to FIGS. 4 and 10.

In FIG. 4, with the head-up display 1, when a driver operates the control unit 14 to have an input signal of the control unit 14 input into the control means 11, a control signal is output to the display 3 to display a mark B simultaneously with actuation of the motor 7 so that the display range A of the display image 10 on the display 3 can be recognized. The mark B is a frame mark indicative of the display range A as shown in FIG. 4 (FIG. 4(a)). Also, the frame mark may be shaped to comprise a disconnected frame (FIG. 4 (b)) positioned on top and bottom of the display range A but not existent left and right of the display range A, or parentheses positioned in corners of the display range A (FIG. 4(c)).

Here, a method of displaying the mark B indicative of a display range A of the display image 10 is described with reference to FIG. 10.

Figure 10:
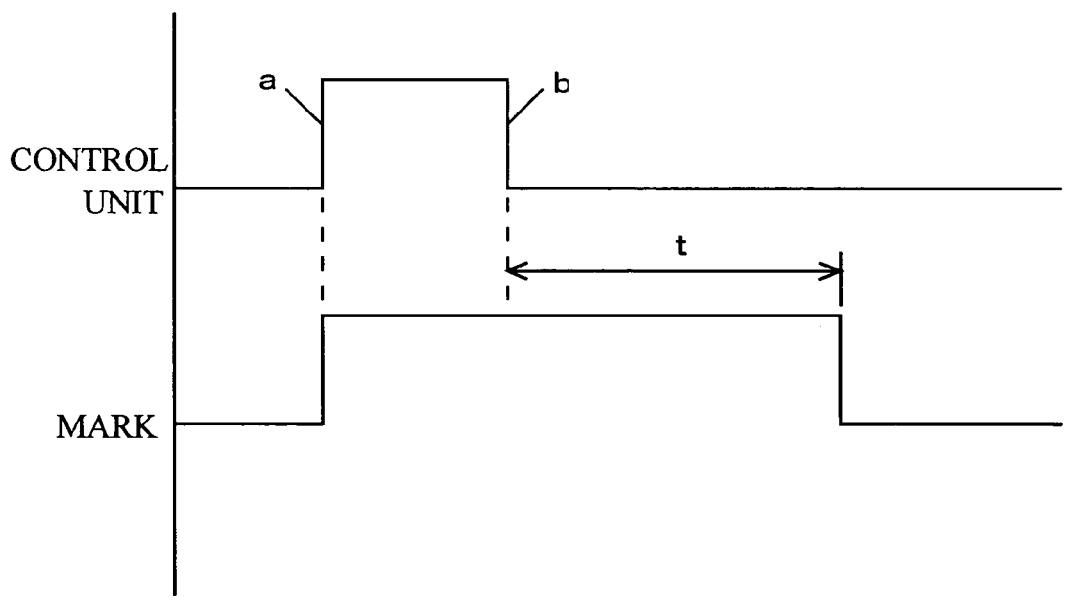

FIG. 10 shows the relationship between switch inputting in the control unit 14 and a period of time, in which the mark B is displayed, in the control means 11.

Detecting a leading edge a of an input signal from the control unit 14, the control means 11 causes the display 3 to begin displaying the mark B indicative of the display range A of the display image 10, and detecting a trailing edge b of an input signal from the control unit 14, the control means 11 outputs a display holding signal to the display 3 so as to hold displaying of the mark B for a predetermined holding time t. Accordingly, the display 3 displays the mark B simultaneously with operation of the control unit 14, and displays the mark B for the predetermined holding time t even when operation of the control unit 14 is terminated.

Also, the control means 11 can modify a length of the holding time t on the basis of operation of the holding time modifying means 15, and it is desired that the holding time t be set in the range of, for example, 0.1 to 3 seconds.

Also, while a mark indicative of the display range A comprises a frame mark shown in FIG. 4, it may comprise a background mark shown in FIG. 5, or reverse displaying of luminous locations and non-luminous locations in FIG. 6, or the whole luminous displaying of the display range A shown in FIG. 7, or the like and thus is not limited to the above embodiment.

Such head-up display 1 holds displaying of the mark B for a predetermined holding time t after a driver terminates operation of the control unit 14 whereby the driver can recognize the display range A of the display image 10 when performing positional adjustment of the display image 10 and can confirm whether a position of the display image 10 is in agreement with the driver's viewpoint, after positional adjustment is made, and make an adjustment very easily so that a display position of the display image 10 is put in agreement with the driver's viewpoint.

In addition, it goes without saying that the invention is not limited to the above embodiments but may be configured to use a combination of, for example, the mark B being a frame mark and the mark C being a background mark.

Also, the display 3 may comprise a light emitting element such as an electric luminous diode (ELD), light emitting diode (LED), and the like, in which case the light source 2 can be omitted.

INDUSTRIAL APPLICABILITY

The invention can be applied to a vehicular display device, and in particular, is suited to a vehicular display device, in which predetermined information is displayed in a display region on a windshield.

The invention claimed is:

1. A vehicular display device comprising a display to emit a display light forming a predetermined display image, a reflecting member to reflect the display light to a driver to have the driver recognizing the display image, moving means for varying a direction of irradiation of the display light irradiated on the reflecting member to move a display position of the display image, operation means to allow driving of the moving means, and control means for displaying a mark indicative of a display range of the display image when the operation means is operated.

2. The vehicular display device according to claim 1, wherein the control means displays a frame mark provided as the mark in a manner to surround the display range of the display image.

3. The vehicular display device according to claim 2, wherein the frame mark comprises a disconnected frame surrounding a periphery of the display range of the display image, or parentheses positioned at ends of the display range of the display image.

4. The vehicular display device according to any one of claims 1 to 3, wherein the control means displays a background mark as the mark such that a background portion of the display range of the display image except the display image is displayed in a different display color from that of the display image.

5. The vehicular display device according to claim 4, wherein the background mark has gradation, in which density is varied from a center of the display range of the display image to a periphery thereof.

6. A vehicular display device comprising a display to emit a display light forming a predetermined display image, a reflecting member to reflect the display light to a driver to have the driver recognizing the display image, moving means for varying a direction of irradiation of the display light irradiated on the reflecting member to move a display position of the display image, operation means to allow driving of the moving means, and control means for reversedly displaying luminous locations, which constitute the display image, and non-luminous locations except the luminous locations in a display range of the display image when the operation means is operated.

7. The vehicular display device according to claim 6, wherein at the time of reversedly displaying the luminous locations and the non-luminous locations, the control means makes luminance less than luminance prior to the reversal.

8. A vehicular display device comprising a display to emit a display light forming a predetermined display image, a reflecting member to reflect the display light to a driver to have the driver recognizing the display image, moving means for varying a direction of irradiation of the display light irradiated on the reflecting member to move a display position of the display image, operation means to allow driving of the moving means, and control means for causing luminous displaying of a whole display range of the display image when the operation means is operated.

9. The vehicular display device according to claim 8, wherein at the time of luminous displaying of the whole display range, the control means makes luminance less than luminance of the display image.

10. A vehicular display device comprising a display to emit a display light forming a predetermined display image, a reflecting member to reflect the display light to a driver to have the driver recognizing the display image, moving means for varying a direction of irradiation of the display light irradiated on the reflecting member to move a display position of the display image, operation means to allow driving of the moving means, and control means for displaying a mark indicative of a display range of the display image when the operation means is operated, and displaying a first display portion corresponding to a direction, in which the display image is moved by the operation means, in a different manner from a second display portion being another display portion.

11. The vehicular display device according to claim 10, wherein the control means displays the mark indicative of the display range of the display image when the operation means is operated, and flashing-displays the display portion of the mark corresponding to the direction, in which the display image is moved by the operation means.

12. The vehicular display device according to claim 10 or 11, wherein the control means displays the mark indicative of the display range of the display image when the operation means is operated, and displays the display portion of the mark corresponding to the direction, in which the display image is moved by the operation means, in a different color from that of another display portion.

13. The vehicular display device according to any one of claims 10 to 12, wherein the control means displays a frame mark provided as the mark in a manner to surround the display range of the display image.

14. A vehicular display device comprising a display to emit a display light forming a predetermined display image, a reflecting member to reflect the display light to a driver to have the driver recognizing the display image, moving means for varying a direction of irradiation of the display light irradiated on the reflecting member to move a display position of the display image, operation means to allow driving of the moving means, and control means for displaying a mark indicative of a display range of the display image when the operation means is operated, and holding displaying of the mark for a predetermined period of time after operation of the operation means is not performed.

15. The vehicular display device according to claim 14, wherein the control means displays a frame mark provided as the mark in a manner to surround the display range of the display image.

16. The vehicular display device according to claim 14, wherein the control means displays a background mark as the mark such that a background portion of the display range of the display image except the display image is displayed in a different display color from that of the display image.

17. The vehicular display device according to any one of claims 14 to 16, further comprising holding time modifying means for varying a period of time, in which displaying of the mark is held.

* * * * *